(12) United States Patent
Ogino et al.

(10) Patent No.: US 7,914,597 B2
(45) Date of Patent: Mar. 29, 2011

(54) DUST COLLECTOR

(75) Inventors: Kazuo Ogino, Aichi (JP); Atsushi Nagata, Aichi (JP); Hitoshi Nozu, Aichi (JP)

(73) Assignee: Panasonic Corporation, Osaka (JP)

( * ) Notice: Subject to any disclaimer, the term of this patent is extended or adjusted under 35 U.S.C. 154(b) by 343 days.

(21) Appl. No.: 12/063,173

(22) PCT Filed: Sep. 15, 2006

(86) PCT No.: PCT/JP2006/318364
§ 371 (c)(1),
(2), (4) Date: Feb. 7, 2008

(87) PCT Pub. No.: WO2007/034743
PCT Pub. Date: Mar. 29, 2007

(65) Prior Publication Data
US 2009/0107093 A1 Apr. 30, 2009

(30) Foreign Application Priority Data
Sep. 20, 2005 (JP) .................................. 2005-271633

(51) Int. Cl.
*B01D 51/00* (2006.01)
(52) U.S. Cl. ............. 55/467; 55/473; 55/385.1; 96/380; 96/382; 96/384; 96/388; 416/223 R; 417/423.5
(58) Field of Classification Search ............ 55/467, 55/473, 385.1; 96/380, 382, 384–388
See application file for complete search history.

(56) References Cited

U.S. PATENT DOCUMENTS

| 3,783,588 | A  | * | 1/1974  | Hudis ............................ 96/58 |
| 4,173,995 | A  | * | 11/1979 | Beck ............................ 165/51 |
| 5,290,331 | A  | * | 3/1994  | Miles et al. .................... 55/321 |
| 6,419,576 | B1 | * | 7/2002  | Han ........................... 454/338 |
| 6,478,538 | B2 |   | 11/2002 | Kim |
| 6,712,889 | B2 | * | 3/2004  | Pillion et al. .................... 96/418 |
| 6,955,708 | B1 | * | 10/2005 | Julos et al. ..................... 95/59 |
| 7,399,085 | B2 | * | 7/2008  | Kim et al. ..................... 353/61 |
| 7,550,021 | B2 | * | 6/2009  | Witter ......................... 55/295 |
| 7,559,744 | B2 | * | 7/2009  | Suzuki et al. ............. 416/169 A |
| 7,748,950 | B2 | * | 7/2010  | Kodama et al. .............. 415/72 |
| 2004/0118285 | A1 | * | 6/2004 | Kim et al. ..................... 96/55 |
| 2005/0160907 | A1 | * | 7/2005 | Zhang et al. .................... 96/66 |
| 2005/0168940 | A1 | * | 8/2005 | Askeland et al. ............. 361/687 |

(Continued)

FOREIGN PATENT DOCUMENTS
CN 2680903 Y 2/2005
(Continued)

OTHER PUBLICATIONS

International Search Report for International Application No. PCT/JP2006/318364 dated Dec. 19, 2006.

*Primary Examiner* — Jason M Greene
*Assistant Examiner* — Dung Bui
(74) *Attorney, Agent, or Firm* — RatnerPrestia

(57) ABSTRACT

A dust collector includes turbofans with inducers fixed to the shafts of electric motors. The electric motors are fixed to the rectangular body with mounting legs. The dust collector further includes a single dust collecting filter under the turbofans. The turbofans have a diameter ranging from 40% to 50% of the length of the short side of the body.

2 Claims, 4 Drawing Sheets

U.S. PATENT DOCUMENTS

| | | | |
|---|---|---|---|
| 2005/0271521 A1* | 12/2005 | Kim et al. | 417/126 |
| 2007/0020103 A1* | 1/2007 | Spaggiari | 416/223 R |
| 2007/0031257 A1* | 2/2007 | Suzuki et al. | 416/182 |
| 2007/0075598 A1* | 4/2007 | Tung et al. | 310/67 R |
| 2010/0028164 A1* | 2/2010 | Matsui | 417/2 |

FOREIGN PATENT DOCUMENTS

| | | |
|---|---|---|
| JP | 62-074427 A | 4/1987 |
| JP | 62-258722 A | 11/1987 |
| JP | 1-155098 A | 6/1989 |
| JP | 01-155098 A | 6/1989 |
| JP | 01-200137 A | 8/1989 |
| JP | 06-257595 A | 9/1994 |
| JP | 2000-271419 A | 10/2000 |
| JP | 2004-053079 A | 2/2004 |
| JP | 2005-169335 A | 6/2005 |
| JP | 2005-520969 A | 7/2005 |
| KR | 2002-0026045 A | 4/2002 |

* cited by examiner

| Diameter | 230mm | 286mm | 310mm |
|---|---|---|---|
| Diameter/Length of short side of body | 38.3% | 47.6% | 51.6% |
| Noises at the same air flow | 58.9dB | 55.1dB | 56.9dB |

| Thickness of peripheral portion | 10mm | 25mm | 40mm |
|---|---|---|---|
| Thickness of peripheral portion/Diameter | 3.5% | 8.7% | 14% |
| Noises at the same air flow | 61dB | 55.1dB | 56.8dB |

FIG. 3A
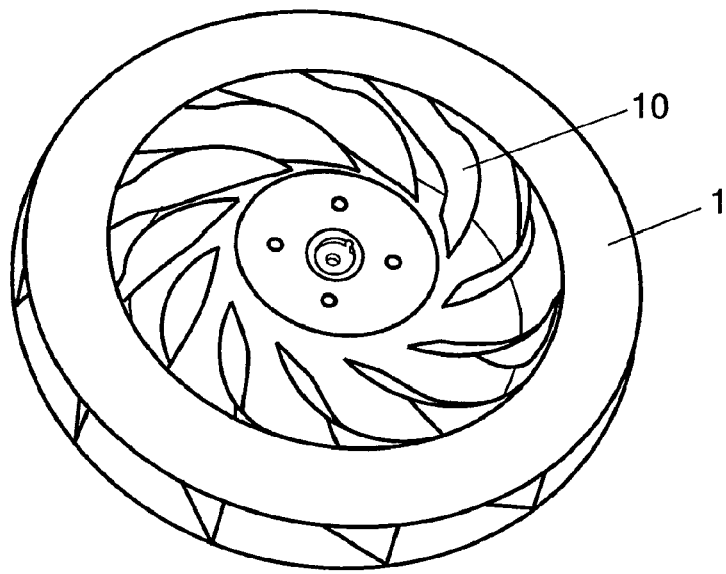
FIG. 3B
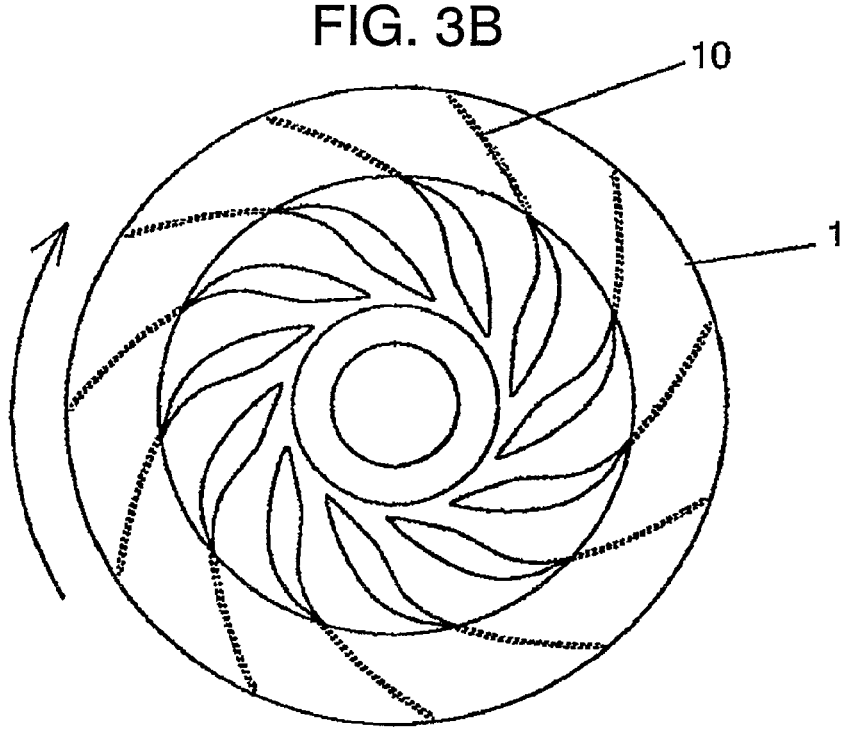
FIG. 3C
| Number of blades | 6 | 11 | 15 |
|---|---|---|---|
| Noises at the same air flow | 59.1dB | 55.1dB | 55.4dB |

DUST COLLECTOR

This application is a U.S. national phase application of PCT International Application PCT/JP2006/318364.

TECHNICAL FIELD

The present invention relates to a dust collector including turbofans and electric motors.

BACKGROUND ART

One example of conventional dust collectors is disclosed in Japanese Patent Unexamined Publication No. 2004-53079 using a spiral case and multiblade fans whose diameter is as large as 50% or more of the length of the short side of the body. In this type of dust collector, the thickness in the shaft direction is usually about 15% of the fan diameter.

The conventional dust collector is described as follows with reference to drawings. FIG. 4 is a sectional side view of the conventional dust collector. As shown in FIG. 4, the dust collector includes impeller 101 having spiral case 102. Impeller 101 has diameter 103, which is at least half of the length of short side 105 of body 104, and thickness 106 in the shaft direction, which is about 15% of diameter 103. The dust collector further includes dust collecting filter 107 disposed on the inlet side.

Such conventional dust collectors have a large thickness. Therefore, the inlet space should be small when the dust collectors are designed for use in clean rooms or integrated into devices that are required to be kept clean. This causes a large air pressure loss, and as a result, an increase in the air flow of the dust collector causes an increase in power consumption and noise.

SUMMARY OF THE INVENTION

The dust collector of the present invention includes a turbofan with a plurality of inducers, a HEPA (High Efficiency Particulate Air) filter, a plurality of DC motors, and a rectangular body. The turbofan has a diameter ranging from 40% to 50% of the length of the short side of the body.

This structure achieves a slim dust collector that provides good inlet conditions, low power consumption, and low noise level.

BRIEF DESCRIPTION OF THE DRAWINGS

FIG. 3A is a perspective view of the turbofans of the dust collector according to the third embodiment of the present invention.

FIG. 3B is a top view of the turbofans of the dust collector according to the third embodiment of the present invention.

FIG. 3C shows the relationship between the number of blades of the turbofans and the noises generated at the same air flow in the dust collector according to the third embodiment.

Figures 1A, 1B:
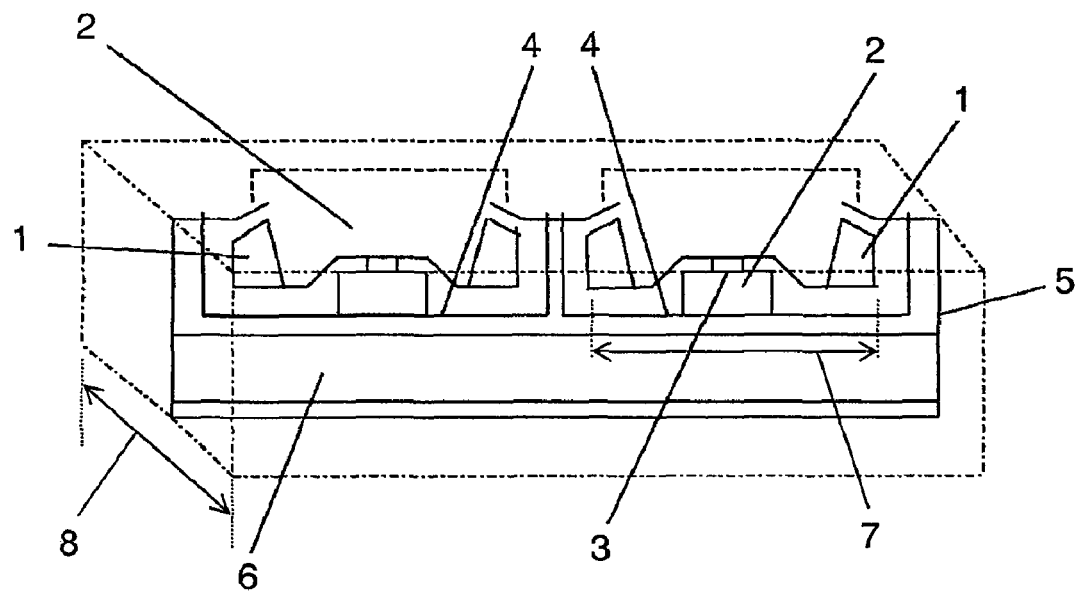
FIG. 1A is a sectional side view of a dust collector according to a first embodiment of the present invention.
FIG. 1B shows the relationship between the ratio of the diameter of the turbofans to the length of the short side of the body and the noises generated at the same air flow in the dust collector according to the first embodiment.

REFERENCE MARKS IN THE DRAWINGS 1 turbofan
2 electric motor
3 shaft
4 mounting leg
5 body
6 dust collecting filter
7 diameter
8 length of a short side
9 thickness of a peripheral portion
10 blade

DETAILED DESCRIPTION OF PREFERRED EMBODIMENTS

Embodiments of the present invention are described as follows with reference to drawings.

First Embodiment

FIG. 1A is a sectional side view of a dust collector according to the first embodiment and FIG. 1B shows the relationship between the ratio of diameter 7 of turbofans 1 to the length of short side 8 of body 5 and the noises generated at the same air flow in the dust collector according to the first embodiment.

As shown in FIG. 1A, turbofans 1 with inducers are fixed to shafts 3 of electric motors 2. Electric motors 2, which are DC motors, are fixed to rectangular body 5 with mounting legs 4. Under turbofans 1 is provided dust collecting filter 6, which is a single HEPA filter.

In the aforementioned structure, when electric motors 2 drive turbofans 1, air is drawn through the suction ports of turbofans 1, collides with body 5, and passes through dust collecting filter 6 disposed at the lower portion of body 5. As a result, dust is collected from the drawn air and then the air is directed downward. In this case, as shown in FIG. 1A, when diameter 7 of turbofans 1 is less than 40% of the length of short side 8 of body 5, turbofans 1 are required to be operated at an increasingly high speed to provide the same air flow. This results in an increase in noise at the same air flow.

On the other hand, when diameter 7 is more than 50% of the length of short side 8 of body 5, the collision between the discharged air and the body causes an increasingly large pressure loss. As a result, turbofans 1 are required to be operated at an increasingly high speed to provide the same air flow. This results in an increase in noise at the same air flow.

As shown in FIG. 1B, in the case of providing the same air flow, when the ratio of diameter 7 of turbofans 1 to the length of short side 8 of body 5 is 38.3% (diameter 7 of turbofans 1 is 230 mm), the noise is 58.9 dB. When the ratio is 47.6% (diameter 7 of turbofans 1 is 286 mm), the noise is 55.1 dB. When the ratio is 51.6% (diameter 7 of turbofans 1 is 310 mm), the noise is 56.9 dB.

Therefore, diameter 7 of turbofans 1 is set ranging from 40% to 50% of the length of short side 8 of body 5. This allows body 5 to be low in pressure loss and makes sure to draw sufficient air inside even when diameter 7 of turbofans 1 is small, thereby reducing noise at the same air flow.

Thus, the dust collector according to the first embodiment of the present invention includes turbofans 1 with inducers driven by electric motors 2 which are DC motors fixed to rectangular body 5, and dust collecting filter 6 for collecting dust from the air drawn by turbofans 1 with the inducers. Setting the diameter of turbofans 1 ranging from 40% to 50% of the length of the short side of body 5 allows body 5 to be low in pressure loss. This achieves a slim dust collector that provides good inlet conditions, low power consumption, and low noise level.

Second Embodiment

Figures 2A, 2B:
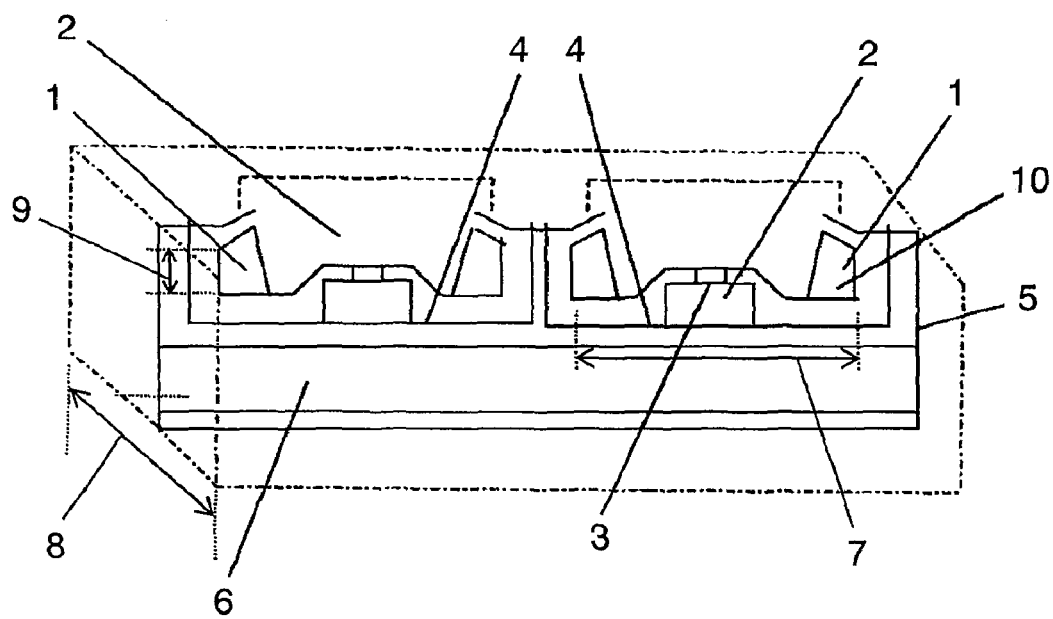
FIG. 2A is a sectional side view of dust collectors according to second and third embodiments of the present invention.
FIG. 2B shows the relationship between the ratio of the thickness of the peripheral portion of the turbofans to the diameter of the turbofans and the noises generated at the same air flow in the dust collector according to the second embodiment.
Figure 4:
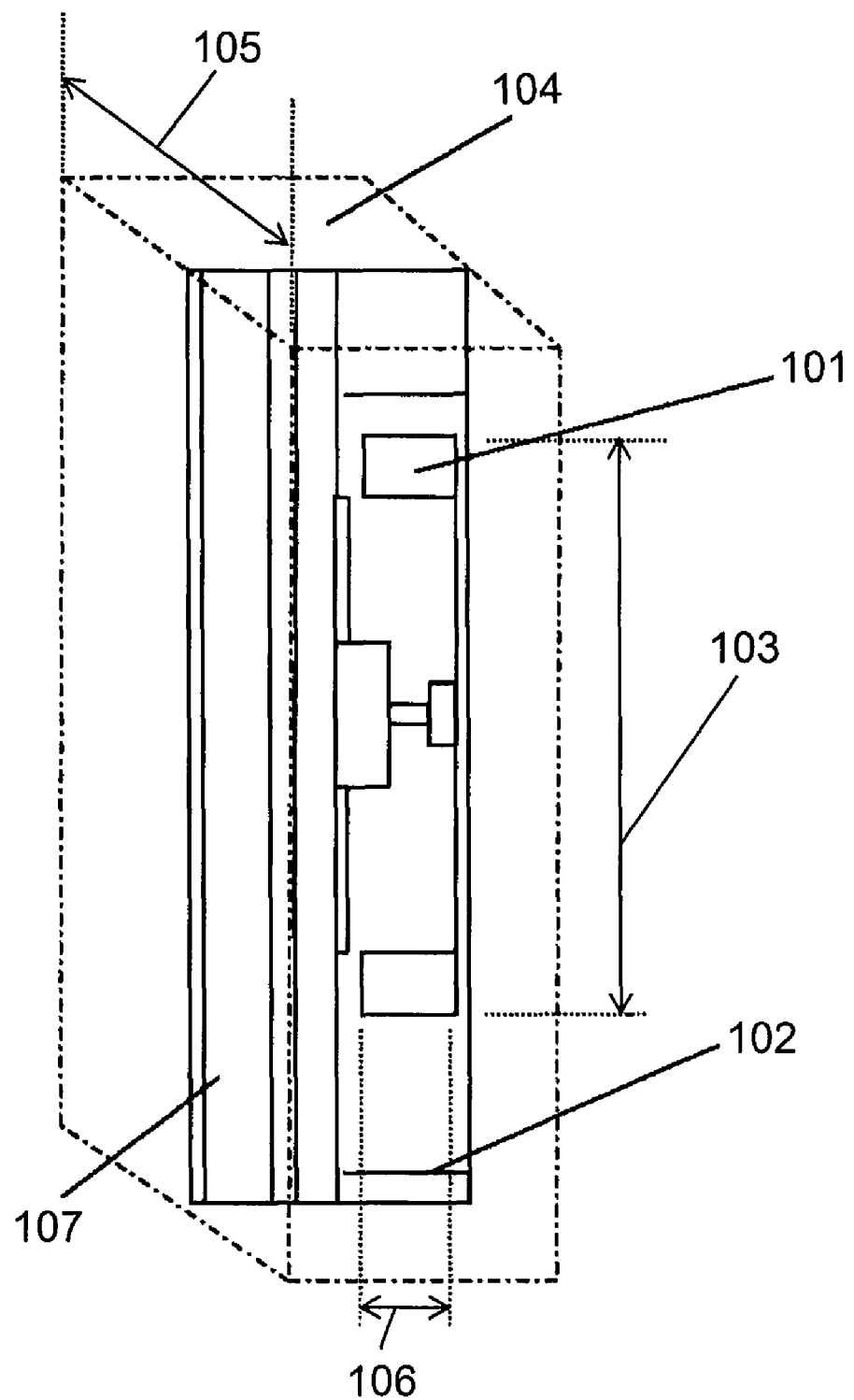
FIG. 4 is a sectional side view of a conventional dust collector.

FIG. 2A is a sectional side view of a dust collector according to a second embodiment, and FIG. 2B shows the relationship between the ratio of thickness 9 of the peripheral portion of turbofans 1 to diameter 7 of turbofans 1 and the noises generated at the same air flow in the dust collector according to the second embodiment. Note that like components are labeled with like reference numerals with respect to the first embodiment, and the description of these components is not repeated.

As shown in FIG. 2A, turbofans 1 with inducers are fixed to shafts 3 of electric motors 2. Electric motors 2, which are DC motors, are fixed to rectangular body 5 with mounting legs 4. Under turbofans 1 is provided single dust collecting filter 6.

In the aforementioned structure, when electric motors 2 drive turbofans 1, air is drawn through the suction ports of turbofans 1, collides with body 5, and passes through dust collecting filter 6 disposed at the lower portion of body 5. As a result, dust is collected from the drawn air and then the air is directed downward. In this case, as shown in FIG. 2A, when thickness 9 of the peripheral portion of turbofans 1 is less than 5% of the diameter of turbofans 1, turbofans 1 are required to be operated at an increasingly high speed to provide the same air flow. This results in an increase in noise at the same air flow. On the other hand, when thickness 9 of the peripheral portion of turbofans 1 is more than 10% of the diameter of turbofans 1, this does not have an effect on reducing the thickness of the dust collector.

As shown in FIG. 2B, in the case of providing the same air flow, when the ratio of thickness 9 of the peripheral portion of turbofans 1 to diameter 7 of turbofans 1 is 3.5% (thickness 9 of the peripheral portion of turbofans 1 is 10 mm), the noise is 61 dB. When the ratio is 8.7% (thickness 9 of the peripheral portion is 25 mm), the noise is 55.1 dB. When the ratio is 14% (thickness 9 of the peripheral portion is 40 mm), the noise is 56.8 dB.

Therefore, thickness 9 of the peripheral portion of turbofans 1 is set ranging from 5% to 10% of the diameter of turbofans 1. This allows body 5 to be low in pressure loss and makes sure to draw sufficient air inside even when diameter 7 of turbofans 1 is small, thereby reducing noise at the same air flow.

This structure allows body 5 to be low in pressure loss, thereby achieving a slim dust collector that provides good inlet conditions, low power consumption, and low noise level.

Third Embodiment

FIG. 3A is a perspective view of turbofans 1 of a dust collector according to a third embodiment of the present invention. FIG. 3B is a top view of turbofans 1 of the dust collector according to the third embodiment of the present invention. FIG. 3C shows the relationship between the number of blades 10 of turbofans 1 and the noises generated at the same air flow in the dust collector according to the third embodiment. The following description is based on FIGS. 2A, 3A, 3B, and 3C. Note that like components are labeled with like reference numerals with respect to first or second embodiment, and the description of these components is not repeated.

As shown in FIG. 2A, turbofans 1 with inducers are fixed to shafts 3 of electric motors 2. Electric motors 2, which are DC motors, are fixed to rectangular body 5 with mounting legs 4. Under turbofans 1 is provided single dust collecting filter 6.

In the aforementioned structure, when electric motors 2 drive turbofans 1, air is drawn through the suction ports of turbofans 1, collides with body 5, and passes through dust collecting filter 6 disposed at the lower portion of body 5. As a result, dust is collected from the drawn air and then the air is directed downward.

As shown in FIGS. 3A and 3B, turbofans 1 of the dust collector of the third embodiment each have 11 blades 10. When the number of blades 10 is nine or less, turbofans 1 are required to be operated at an increasingly high speed to provide the same air flow. This results in an increase in noise at the same air flow.

When the number of blades 10 is ten or more, the speed of turbofans 1 can be low, thereby reducing noise at the same air flow.

FIG. 3C shows the relationship between the number of blades 10 of turbofans 1 and the noises generated at the same air flow. As shown in FIG. 3C, in the case of providing the same air flow, when the number of blades 10 of turbofans 1 is six, the noise is 59.1 dB. When the number of blades 10 is 11, the noise is 55.1 dB. When the number of blades 10 is 15, the noise is 55.4 dB.

Therefore, as shown in FIGS. 3A and 3B, turbofans 1 each have at least ten blades 10. In the present third embodiment, turbofans 1 each have 11 blades 10. As a result, turbofans 1 can have a high air-flow capacity even when they are thin and compact.

This structure allows turbofans 1 to have a low noise level in spite of their thinness, thereby providing a slim dust collector having a sufficient dust-collecting performance.

INDUSTRIAL APPLICABILITY

The dust collector of the present invention is slim and yet provides good inlet conditions, low power consumption, and low noise level, thereby being useful for industrial equipment installed in clean rooms or similar environments.

The invention claimed is:
1. A dust collector comprising:
a turbofan with a plurality of inducers driven by a plurality of DC motors fixed to a rectangular body; and
a dust collecting filter for collecting dust from air drawn by the turbofan with the plurality of inducers, wherein
the turbofan has a diameter ranging from 40% to 50% of a short side of the body; and
a peripheral portion of the turbofan has a thickness ranging from 5% to 10% of the diameter of the turbofan.
2. The dust collector of claim 1, wherein
the turbofan has at least 10 blades.

* * * * *